Patented Nov. 2, 1937

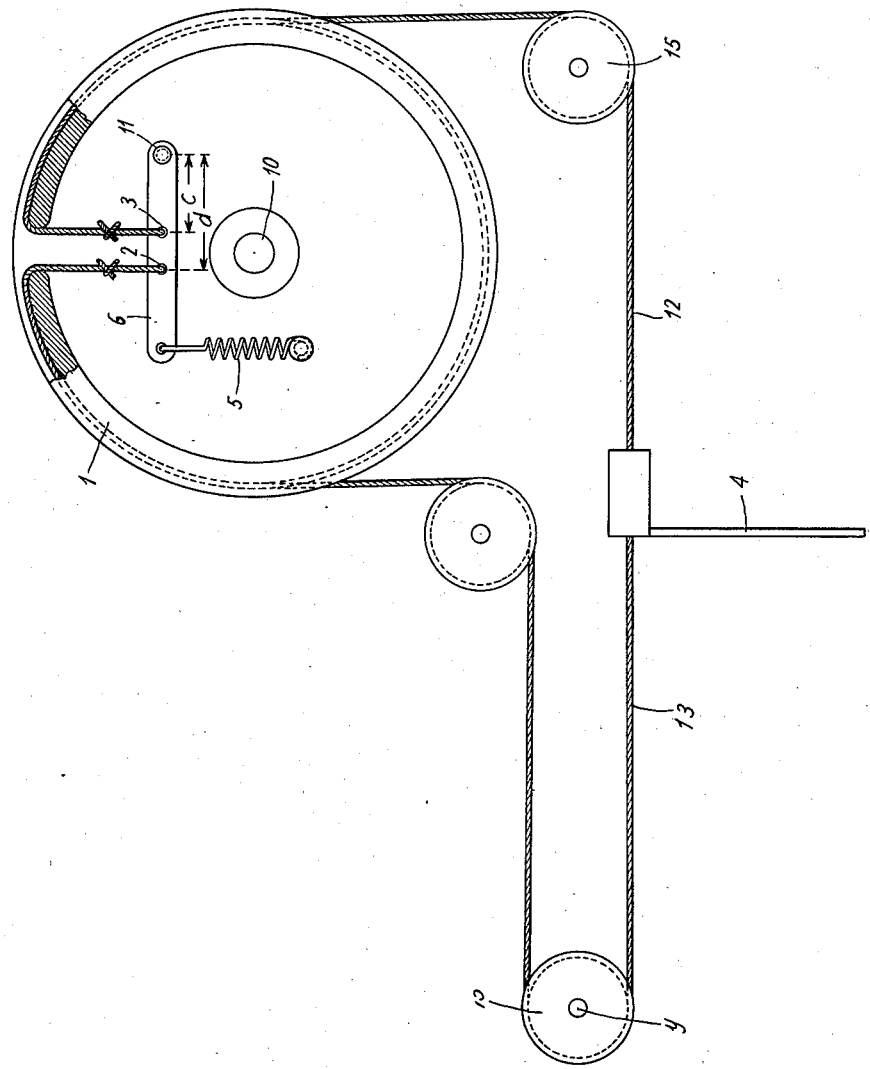

2,097,928

UNITED STATES PATENT OFFICE 2,097,928

CORD TENSIONING DEVICE FOR TUNING MEANS

Erwin König, Berlin-Neukolln, Germany, assignor to Allgemeine Elektricitats Gesellschaft Friedrick Karl, Berlin, Germany, a corporation of Germany Application January 30, 1936, Serial No. 61,549
In Germany March 25, 1935

3 Claims. (Cl. 116—124.1)

Cord or belt drives for tuning means are known in the art in which the cord is provided to drive the tuning element and at the same time is used for coupling the pointer and the tuning element. These arrangements involve the drawback that the extension of the cord due to its elongation under stress affect also the position of the pointer on the scale so that in the course of time errors will arise in the tuning of the dial. The arrangements known in the art are so chosen that one end of the cord is attached rigidly to the pulley and the other end is fastened thereon tensionally by the use of a spring. Inasmuch as the spring will always pull the cord only to one side or end, such extensions of the cord as may happen will act upon the scale pointer in accordance with the relationship of the lengths of the cord ends moving away from the pointer.

Now, the present invention is based upon the idea of so controlling the effects of elongations of the cord in a positive manner that the pointer secured on the cord will preserve its position in reference to the dial or scale unchanged.

For a better understanding of the invention, reference is made to the accompanying drawing which shows a front view of a tuning shaft connected to an indicator by a cord drive arranged according to one embodiment thereof.

In the device shown the tuning shaft 10 of a radio receiver carries a large pulley 1 to which is pivotally secured a lever 6 as by a pin 11. A cord or cords 12, 13 are secured to a pointer or indicator 4 and which moves in a straight line along a linear graduated scale (not shown). The cords are guided at intermediate points by small rotatable pulleys 15 and their ends, after passing around the periphery of the large pulley are secured to lever 6 through holes 2 and 3 therein. Any stretching or elongation of the cord or cords is automatically taken up by a small motion of lever 6 caused by a spring 5 secured at one end to the lever and at its other end to the pulley 1. By attaching the cords to the lever at distances $c$ and $d$ from its pivot point so that these distances are proportional to the lengths of the cords measured from the pointer, the position of the pointer will be unaffected by any stretching of the cords.

Having described my invention, what I claim as new and desire to secure by Letters Patent is:

1. Means for indicating the position of an adjustable radio device comprising the combination of a pulley connected to said device, a pointer, cords extending in opposite directions over the periphery of said pulley to said pointer, a lever pivotally connected to said pulley and having spaced apart points to which the ends of said cords are secured, and means moving said lever in a direction to tension said cords.

2. Means for indicating the position of an adjustable radio device comprising the combination of a pulley connected to said device, a pointer, cords extending in opposite directions over the periphery of said pulley and connected to said pointer, a lever having one end pivotally connected to said pulley and points to which the ends of said cords are secured, the distances between said points and the pivot point of said lever being substantially proportional to the lengths of said cords, and resilient means cooperating with said lever to tension said cords.

3. Means for indicating the position of a tuning device comprising the combination of a main pulley connected to said device, a pointer, two pulleys located between said pointer and said main pulley, cords extending from opposite sides of said pointer over said two pulleys and around opposite edges of said main pulley, a lever pivoted to said main pulley and having spaced apart points to which the ends of said cords are secured and a spring interposed between the end portion of said lever and pulley.

ERWIN KÖNIG.